(12) United States Patent
Schneider

(10) Patent No.: US 6,848,693 B2
(45) Date of Patent: Feb. 1, 2005

(54) PSEUDO FOUR-LEG VEHICLE LEVELING SYSTEM WITH INDEPENDENT LEG LOCK-OUT

(75) Inventor: Robert H. Schneider, Beaver Dam, WI (US)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/299,633

(22) Filed: Nov. 19, 2002

(65) Prior Publication Data

US 2003/0094316 A1 May 22, 2003

Related U.S. Application Data

(60) Provisional application No. 60/331,864, filed on Nov. 20, 2001.

(51) Int. Cl.$^7$ ................................................ B60S 9/12
(52) U.S. Cl. ................................. 280/6.153; 280/6.155
(58) Field of Search ........................ 180/41; 280/6.153, 280/6.154, 6.155, DIG. 1; 254/423

(56) References Cited

U.S. PATENT DOCUMENTS

| | | | |
|---|---|---|---|
| 935,982 A | 10/1909 | Herbert et al. | |
| 1,665,762 A | 4/1928 | Waream | |
| 3,037,778 A | 6/1962 | Chedister et al. | |
| 3,059,918 A | 10/1962 | Pribonic | |
| 3,404,899 A | 10/1968 | Vogel | |
| 3,603,614 A | * 9/1971 | Gauchet | ................. 280/764.1 |
| 3,643,970 A | * 2/1972 | Gauchet | ................. 280/6.154 |
| 3,669,409 A | 6/1972 | Eranosian | |
| 3,817,493 A | 6/1974 | Hanser | |
| 3,885,813 A | 5/1975 | Kern | |
| 3,901,532 A | 8/1975 | Hornagold | |
| 4,044,999 A | 8/1977 | Dodgen | |
| 4,053,073 A | 10/1977 | Franchin | |
| 4,061,309 A | 12/1977 | Hanser | |
| 4,067,543 A | 1/1978 | Orth et al. | |
| 4,071,147 A | 1/1978 | Hornagold | |
| 4,082,249 A | 4/1978 | Valdespino et al. | |
| 4,084,830 A | 4/1978 | Daniel, Jr. et al. | |
| 4,165,861 A | 8/1979 | Hanser | |
| 4,174,094 A | 11/1979 | Valdespino et al. | |
| 4,216,939 A | 8/1980 | Valdespino | |
| 4,449,734 A | * 5/1984 | Cory | ................. 280/766.1 |
| 4,558,886 A | 12/1985 | Straub | |
| 4,597,584 A | 7/1986 | Hanser | |
| 4,611,815 A | 9/1986 | Sasage et al. | |

(List continued on next page.)

Primary Examiner—David R. Dunn
(74) Attorney, Agent, or Firm—Quarles & Brady LLP

(57) ABSTRACT

A pseudo four-leg leveling system for a vehicle, such as a recreational vehicle or the like, includes four jacks in the form of hydraulic cylinders mounted in pairs at the front and rear of the vehicle. A power system supplies hydraulic fluid to extend and retract the jacks thereby adjusting the attitude of the vehicle relative to level. The front two jacks are driven in parallel and the rear jacks are driven separately and independent of the front jacks. When the power system is de-energized the front jacks are hydraulically isolated to improve the stability of the system when static. Pressure operated valves automatically control the isolation of the jacks driven in parallel, as well as return passage to the tank, without the need for additional electronically controlled valves.

13 Claims, 3 Drawing Sheets

U.S. PATENT DOCUMENTS

| | | |
|---|---|---|
| 4,641,843 A | 2/1987 | Morrisroe, Jr. |
| 4,678,041 A | 7/1987 | Staudinger |
| 4,743,037 A | 5/1988 | Hanser |
| 4,746,133 A | 5/1988 | Hanser et al. |
| 4,784,400 A | 11/1988 | Hofius |
| 4,815,711 A | 3/1989 | Bruno et al. |
| 4,865,295 A | 9/1989 | Holloway |
| 4,887,840 A | 12/1989 | Harara et al. |
| 4,974,861 A | 12/1990 | Itoh et al. |
| 5,013,011 A | 5/1991 | Halloway |
| 5,159,989 A * | 11/1992 | Claxton .................. 180/41 |
| 5,176,391 A | 1/1993 | Schneider et al. |
| 5,188,379 A | 2/1993 | Krause et al. |
| 5,258,913 A * | 11/1993 | Baldauf .................. 701/37 |
| 5,312,119 A | 5/1994 | Schneider et al. |
| 5,580,095 A * | 12/1996 | Fukumoto ............... 280/766.1 |
| 5,628,521 A * | 5/1997 | Schneider et al. ....... 280/6.153 |
| 5,676,385 A * | 10/1997 | Schneider et al. ....... 280/6.153 |
| 5,890,721 A * | 4/1999 | Schneider et al. ....... 280/6.153 |
| 5,901,969 A * | 5/1999 | Schneider et al. ....... 280/6.153 |
| 5,913,525 A * | 6/1999 | Schneider et al. ....... 280/6.153 |
| 5,915,700 A | 6/1999 | Schneider et al. |
| 5,931,500 A * | 8/1999 | Dagnese ................. 280/766.1 |
| 6,050,573 A * | 4/2000 | Kunz .................... 280/6.153 |
| 6,176,495 B1 * | 1/2001 | Decker ................... 280/6.153 |

* cited by examiner

PSEUDO FOUR-LEG VEHICLE LEVELING SYSTEM WITH INDEPENDENT LEG LOCK-OUT

CROSS-REFERENCE TO RELATED APPLICATION

This application claims the benefit of U.S. provisional application Ser. No. 60/331,864, filed Nov. 20, 2001.

STATEMENT OF FEDERALLY SPONSORED RESEARCH OR DEVELOPMENT

Not applicable.

BACKGROUND OF THE INVENTION

1. Technical Field

The present invention relates to a leveling system for use with a vehicle, such as a recreational vehicle.

2. Description of the Related Art

Various systems are known for leveling a vehicle such as a recreational vehicle. These systems are typically hydraulic powered systems that automatically level the vehicles to which there are attached in response to certain operator commands. Some such systems have four spring-biased hydraulic cylinders or "jacks" located one adjacent each corner of the vehicle. (See U.S. Pat. Nos. 4,061,309; 4,165,861; 4,597,584; 4,743,037; and 4,746,133). One problem with four independently operating jacks at each corner of the vehicle is that they tend to twist the vehicle frame during unsynchronized extension and retraction of the jacks.

U.S. Pat. No. 5,176,391, owned by the same assignee as the present application, discloses a vehicle leveling system having three jacks, two of which are located at the rearward end of the vehicle and one of which is located at the forward end of the vehicle. The use of a single front jack reduces twisting of the vehicle frame, however, it makes the system less stable because two corners of the vehicle are left unsupported.

U.S. Pat. No. 5,915,700, also owned by the assignee of the present application and incorporated by reference as though fully set forth herein, teaches a "pseudo four-leg" vehicle leveling system. That system has four jacks with one pair of jacks at one end of the vehicle driven in parallel and the other two jacks being driven independent of each other and the two jacks in parallel. The two jacks in parallel are in fluid communication with each other so that one end of the vehicle can "float" between the common jacks during extension and retraction. In other words, the hydraulic fluid will flow between the parallel jacks to provide more or less pressure in either jack depending on which side of the vehicle exerts more downward force, thereby reducing frame twisting. The stability of the system is also improved because all four corners of the vehicle are supported when the jacks are extended, however, because the hydraulic fluid can flow between the parallel jacks it is less stable than convention four leg systems when the jacks are static.

Accordingly, a vehicle leveling system with improved stability during static operation is needed.

SUMMARY OF THE INVENTION

In accordance with one aspect of the invention, a vehicle leveling system includes a control mechanism, a series of extendible and retractable jacks mounted to the frame of the vehicle and a power system interposed between the jacks and the control mechanism for supplying hydraulic fluid to selectively extend and retract the jacks. The system includes four jacks, two being located toward each end of the vehicle. Two of the jacks at one end of the vehicle are operated in tandem and the other two are operated independent of each other and the tandem pair to form a pseudo four-leg system. Each jack, including those in the tandem pair, is independently hydraulically lockable so that they can be locked after the leveling operation is performed, for example, when the system is de-energized.

Each jack is preferably in the form of a hydraulic cylinder assembly including a cylinder and an extendible and retractable piston mounted to the cylinder. A spring is interposed between the cylinder and the piston. Introduction of pressurized fluid into the cylinder causes extension of the piston against the force of the spring, and the spring causes retraction of the piston when fluid pressure within the cylinder is relieved. A shoe is connected to the extendible and retractable piston, and the spring is preferably interconnected between the cylinder and the shoe.

The power system is preferably a fluid power system consisting of a hydraulic fluid reservoir, a pump for selectively supplying fluid under pressure to the jacks from the reservoir, and a control valve interposed between the hydraulic fluid reservoir and each jack. Each control valve controls the supply of pressurized fluid to one or more of the jacks during operation of the pump, and also provides flow of fluid to the reservoir when the pump is not operating.

The two jacks in tandem are in fluid communication with each other, and share a common control valve. The control valves are responsive to operation of the manually actuated switches for selectively adjusting the attitude of the vehicle relative to level in response to manual actuation by the operator. Each control valve is located on a valve block interconnected with a common line feeding the tandem jacks after their control valve splits at a location within the valve block. A single return line is interconnected with the reservoir and a return control valve, preferably a normally open pressure operated check valve, is disposed in the return line for controlling flow of fluid from the jacks to the reservoir.

These and still other advantages of the invention will be apparent from the detailed description and drawings. What follows is a preferred embodiment of the present invention. To assess the full scope of the invention the claims should be looked to as the preferred embodiment is not intended as the only embodiment within the scope of the invention.

DETAILED DESCRIPTION OF THE PREFERRED EMBODIMENTS

Figure 1:
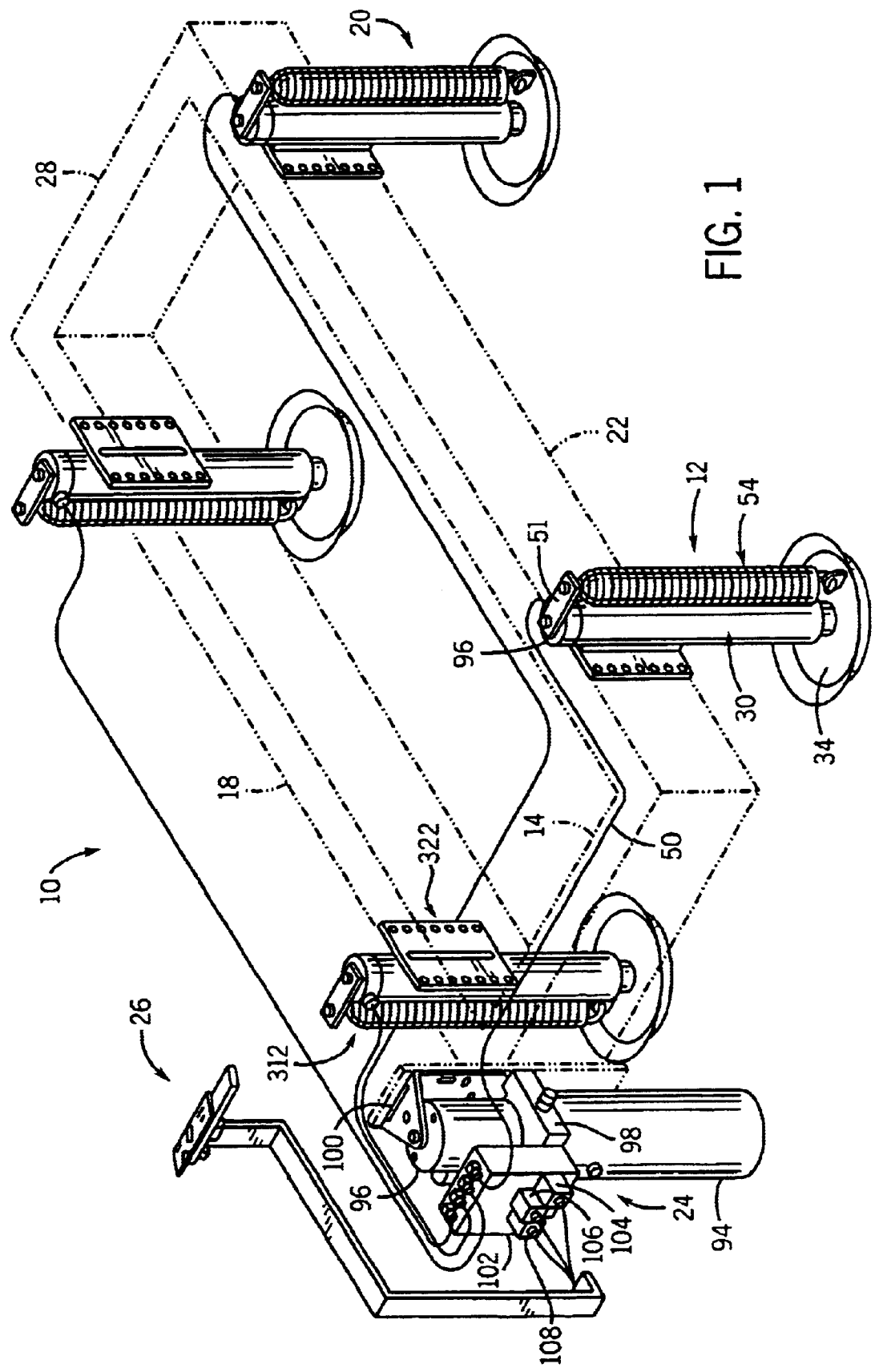
FIG. 1 is an isometric view of a pseudo four-leg vehicle leveling system constructed according to the invention as installed on the frame of a vehicle such as a recreational vehicle.

FIG. 1 shows a vehicle leveling system 10 according to the invention mounted on the frame members of a vehicle, such as a recreational vehicle or the like. The system 10 includes four jack assemblies 12, 16, 20 and 312. Jacks 312 and 16 are mounted near respective front and rear ends of a passenger side longitudinal frame member 18 and jacks 12 and 20 are similarly mounted to a driver side longitudinal frame member 22 connected to frame member 18 by two transverse frame members 14 and 28.

The front jacks 12 and 312 are extended in parallel, and as such the system can be referred to as a pseudo four-leg vehicle leveling system. It should thus be appreciated that the pseudo four-leg system of FIG. 1 can enhance the stability of the vehicle over a three-leg system. This form of the invention does not require that the pair of jacks operated in parallel be located towards the front of the vehicle, but it has been found that it is advantageous to do so.

The jacks 12, 16, 20 and 312 are identical, preferably being constructed as described in U.S. Pat. Nos. 5,100,105 or 5,915,700, both of which form a part of this disclosure. The jacks thus will not be described in great detail here, however, generally the jacks have a hydraulic cylinder assembly 30 with a sliding piston to which a circular shoe 34 is mounted. A top cap 46 mounted to the upper end of the cylinder has a fitting 48 for connecting a hydraulic fluid line 50. A coil spring 54 extending between shoe 34 and a mounting plate 51 near the cap 46 biases the piston to slide into the cylinder.

The system also includes a manually operated control panel 26 mounted within the interior of the vehicle. Like the construction of the jacks, U.S. Pat. No. 5,915,700 describes in detail preferred electronic controls for manual and semi-automatic operation of the leveling system, and thus this will not be discussed at length here. Generally, however, the control panel 26 is preferably able to mount to the dashboard of the vehicle so that its manually operable front, rear, left and right actuator switches lie in a diamond pattern with its longitudinal axis parallel to the longitudinal axis of the vehicle so that each switch aligns with its corresponding side of the vehicle.

Figure 2:
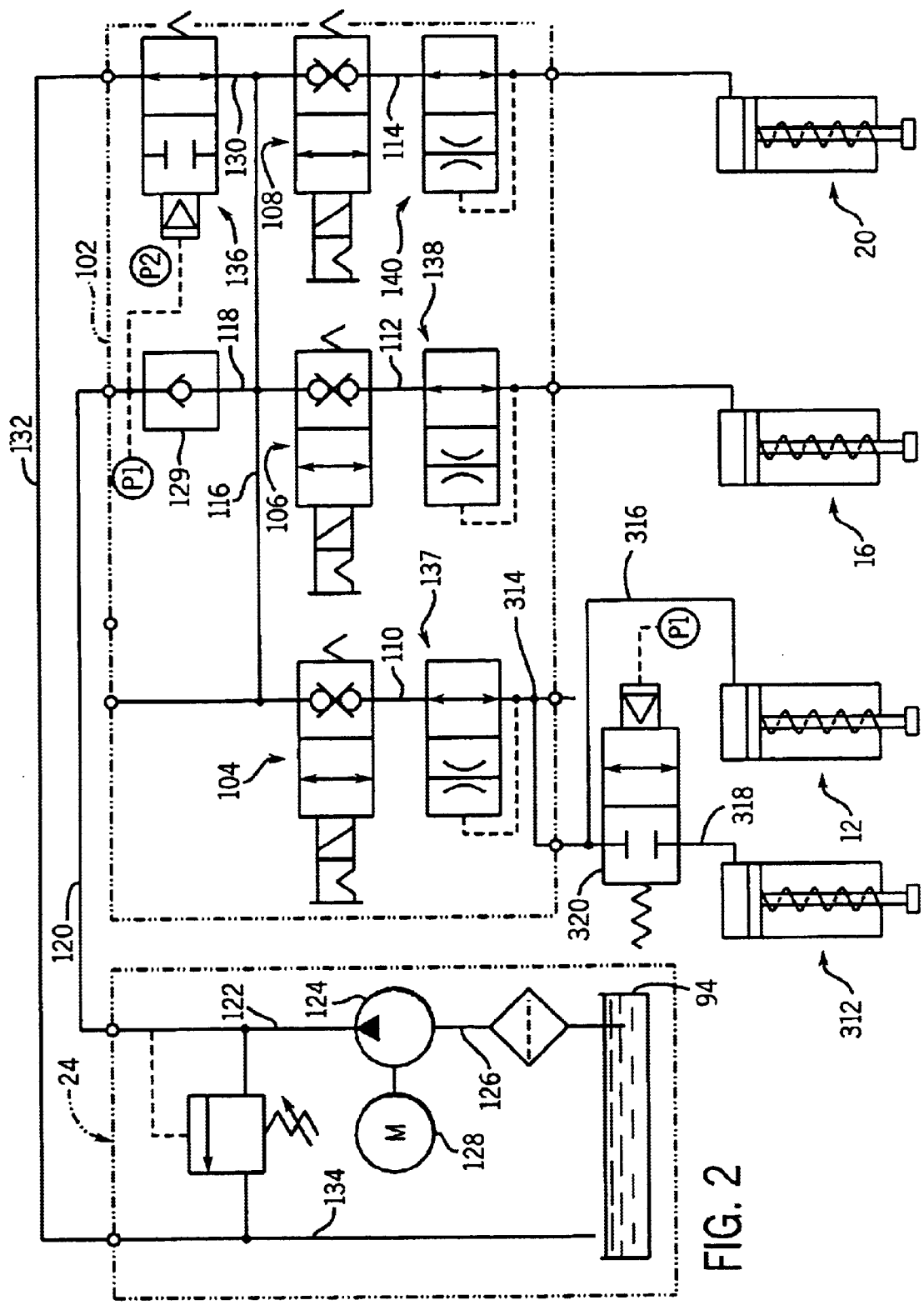
FIG. 2 is one preferred schematic representation of the pseudo four-leg vehicle leveling system of FIG. 1.

Referring now to FIGS. 1 and 2, a reservoir, pump and actuator assembly 24 includes a hydraulic fluid reservoir 94 and a pump and motor assembly 96, both of which are mounted to a mounting block 98 disposed therebetween. A mounting bracket 100 is interconnected with pump and motor assembly 96 and block 98 for mounting the reservoir, pump and actuator assembly 24 to frame member 14.

A valve block 102 is mounted to block 98, and a series of supply/return control valves 104, 106 and 108 are mounted to valve block 102. Supply/return control valves 104, 106, and 108 are solenoid operated dual poppet bidirectional blocking valves, with a manual override, such as manufactured by Delta under its Part No. 86020151.

The hydraulic fluid power system for extending and retracting jacks 12, 16 and 20 as illustrated in FIG. 2 is substantially similar to the hydraulic system shown in U.S. Pat. No. 5,176,391, owned by the same assignee as the present application, the disclosure of which is hereby incorporated by reference. Similarly, the construction of reservoir, pump and actuator assembly 24 is substantially identical to the reservoir, pump and actuator assembly as disclosed in U.S. Pat. No. 5,176,391, and reference is made to the description contained in U.S. Pat. No. 5,176,391 for a detailed explanation of the construction of reservoir, valve and actuator assembly 24.

Referring to FIG. 2, supply/return control valves 104, 106, and 108 are located in secondary supply/return passages 110, 112 and 114, respectively. Valves 104, 106, and 108 each include a rightward block having a double check valve and a leftward block providing free flow therethrough. Valves 104, 106, and 108 are biased toward their closed position shown in FIG. 2 in which their rightward blocks are located in passages 110, 112, and 114, respectively, so as to close off these passages and thereby isolate and hydraulically lock jacks 16 and 20 from each other and jacks 12 and 312 when the jacks are static. In accordance with known construction, valves 104, 106, and 108 are shiftable rightwardly in response to supply of electrical current to a solenoid in response to operation of the corresponding switch(es) on the control panel 26. In the event of an electrical failure, valves 104, 106, and 108 can be manually shifted between their rightward and leftward positions.

Secondary supply/return passages 110, 112 and 114 each communicate with a primary supply/return passage 116, which in turn communicates with reservoir 94 through a passage 118 and a line 120 extending between passage 118 and a line 122 interconnected with pump 124, which forms a part of motor and pump assembly 96 (FIG. 1). Pump 124 is interconnected with reservoir 94 through a line 126, and is driven by motor 128 which forms a further part of motor and pump assembly 96.

A check valve 129 is mounted within passage 118 for providing one-way flow of fluid from pump 124 through line 120 to primary supply/return passage 116.

A return passage 130 is formed in block 102, communicating between primary supply/return passage 116 and a line 132 which interconnects with a return line 134 to provide return flow of fluid to reservoir 94 from primary supply/return passage 116. A return control valve 136 is provided in passage 130 for controlling return flow of fluid from primary supply/return passage 116 to reservoir 94. Return control valve 136 is a pressure operated valve biased in its normally open position shown in FIG. 2 when pilot pressure at P2 is at or near zero, such as when the pump is not energized, and allows flow in return passage 130 from primary supply/return passage 116 to line 132. As pilot pressure P2 raises from pressurization of the system the return control valve 136 automatically shifts to block flow through passage 130.

A series of retraction restricting valves 137, 138 and 140 are located in passages 110, 112 and 114, respectively between jacks 12, 16, 20 and supply/return control valves 104, 106, and 108, respectively. Retraction restricting valves 137, 138, and 140 are generally constructed in accordance with the teachings of Schneider U.S. Pat. No. 4,704,947 entitled "Bidirectional Fluid Flow Valve", owned by the same assignee as the present application, and the disclosure of which is hereby incorporated by reference. Valves 137, 138, and 140 provide unrestricted flow in passages 110, 112, and 114, respectively, during supply of pressurized fluid from primary supply/return passage 116 to jacks 12, 16, 20, respectively, to extend jacks 12, 16, 20 and 312. On the other hand, when fluid pressure in primary supply/return passage 116 is relieved and flow control valves 104, 106, and 108 are shifted rightwardly to provide retraction of jacks 12, 16, 20 and 312 retraction restricting valves 137, 138, and 140 are shifted rightwardly to provide a restriction in the return flow of fluid from jacks 12, 16, 20 and 312 to primary supply/return passage 116, until pressure on jacks 12, 16, 20 and 312 is relieved to a predetermined extent. For instance, retraction restricting valve 137 can be shifted to provide slow retraction of front jacks 12 and 312 until the front vehicle wheels engage the ground and relieve pressure on jacks 12 and 312. When this occurs, retraction restricting valve 137 is shifted to its FIG. 2 position to eliminate the restriction in flow through valve 137 and to provide full flow of fluid there across in secondary supply/return line 110 thus providing faster retraction of jacks 12 and 312. In a similar manner, retraction restricting valves 138, 140 provide slow retraction of jacks 16, 20, respectively until the rear tire set adjacent each jack engages the ground, and thereafter fast retraction of jacks 16, 20.

As mentioned, the second front jack 312 is operated in parallel with the first front jack assembly 12. In particular, supply/return control valve 104 and retraction restricting valve 137 control the flow of hydraulic fluid through passage 110 in valve block 102 to both the first front jack assembly 12 and the second front jack assembly 312. Common passage 110 has a branch point 314 from which hydraulic fluid is supplied to jack 12 through passage 316 and to jack 312 through passage 318. There is a pressure operated control valve 320 along passage 318. The control valve 20 is biased in its normally closed position shown in FIG. 2 when pilot pressure at P1 is at or near zero, such as when the pump is not energized. This blocks passage 318 and isolates jack 312 from jack 12 when the system is de-energized or in a static condition. Thus, all four jacks 12, 312, 16 and 20 are hydraulically locked independently of one another when not being raised or lowered. When the system is pressurized, such as during extension of the jacks, pilot pressure P1 will shift the valve 320 to its open position allowing flow through passage 318. Since there is no control valve in passage 316, when valve 320 is open the hydraulic fluid pressure in the first front jack assembly 12 will equalize during operation with the hydraulic fluid pressure in the second front jack 312 to extend and retract the front jacks in unison.

In operation, to level the vehicle the operator first actuates a power ON/OFF switch (not shown) on the control panel 26 to energize the system. Energizing the system raises pilot pressure P2 which closes off passage 130 so that the hydraulic fluid will flow to control valves 104, 106 and 108 and not back to the reservoir 94. Manually or electronically the attitude of the vehicle relative to level is ascertained and the appropriate switches are activated to extend one or more of the jacks as needed, the front two jacks 12 and 312 extending together uniformly and each of the rear jacks 16 and 20 extending independently. The switches interconnected with valves 104, 106, and 108 to provide selective extension of jacks 12, 16, 20 and 312. Specifically, a front switch controls extension of both front jacks 12 and 312 in parallel; a rear switch controls extension of rear jacks; a left switch controls extension of driver side rear jack 20; and a right switch controls operation of passenger side rear jack 16. Once the vehicle is properly leveled, the operator can again actuate the power switch to de-energize the system. This will lower pilot pressure P1 to cause valve 320 to close and thus isolate and lock out jack 312 from jack 12. Isolating these two jacks prevents redistribution of hydraulic fluid and thus pressure fluctuations between the jacks 12 and 312, which thereby improves their stability. The other jacks 16 and 20 are each isolated and hydraulically locked by the closer of valves 106 and 108.

A RETRACT ALL JACKS switch (not shown) is actuated by the operator when it is desired to move the vehicle. This switch is interconnected with valves 104, 106, and 108 to shift them rightwardly, in order to provide retraction of jacks 12, 16, 20 and 312 under the influence of the springs of each jack. Note that pilot pressure P2 lowers sufficiently to allow return control valve 136 to open and thus unblock passage 130 allowing hydraulic fluid to flow from passage 116 to passage 132.

The system of the present invention is designed so that it can only be operated when the transmission of the vehicle is engaged in its neutral or park conditions and when the parking brake is engaged. If any one of these conditions is violated, the electronics of the system automatically provide retraction of jacks 12, 16, 20 and 312.

Figure 3:
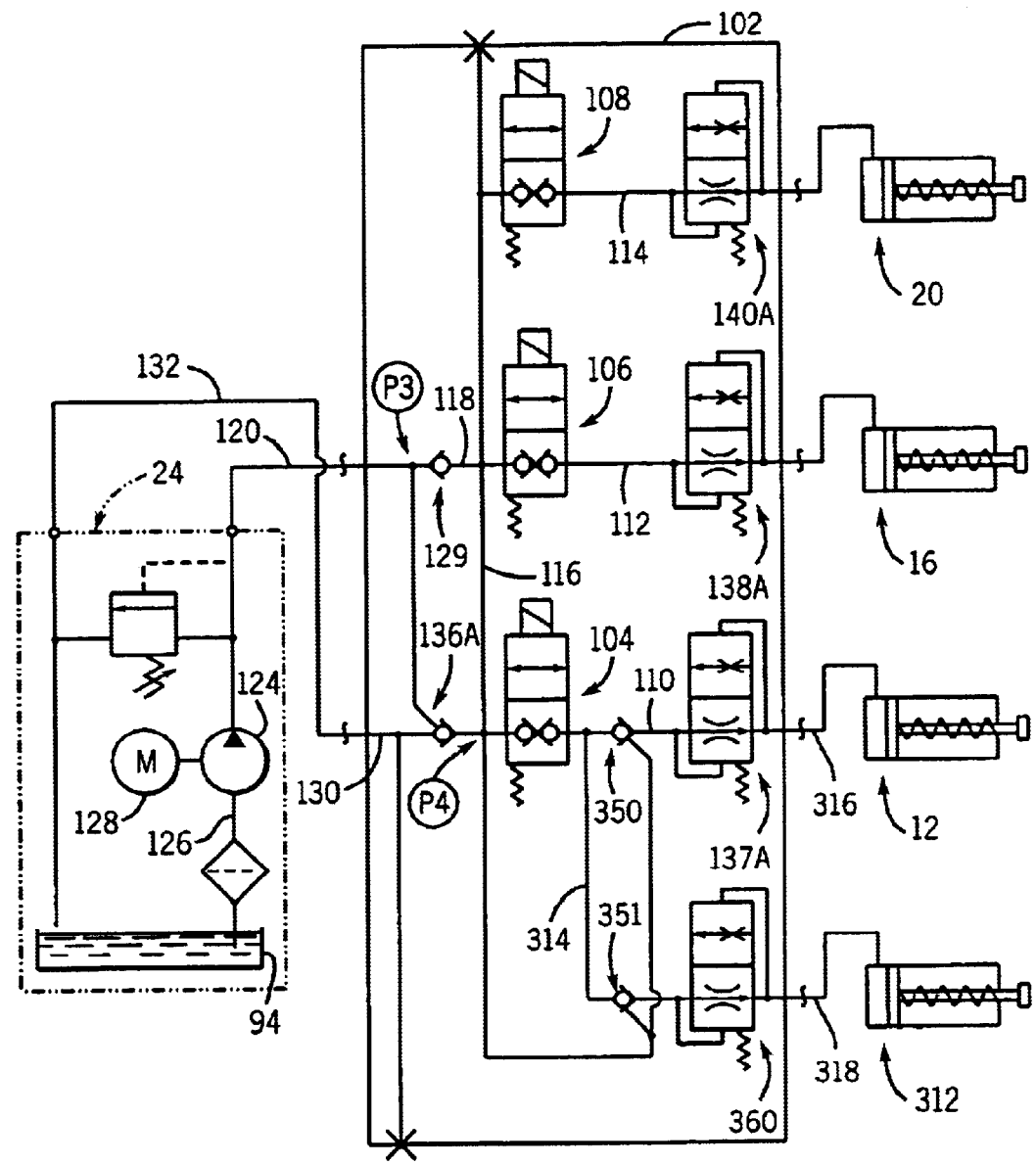
FIG. 3 is another preferred schematic representation of the pseudo four-leg vehicle leveling system of FIG. 1.

FIG. 3 shows another preferred system for practicing the present invention. This system is similar to that described above having four identical jacks 12, 16, 20 and 312 and an identical reservoir, pump and actuator assembly 24 including a hydraulic fluid reservoir 94 interconnected with pump 124 through a line 126 and driven by motor 128. As before, this assembly is connected via a supply line 120 and a return line 132 to a valve block 102 having a series of solenoid supply/return control valves 104, 106 and 108. The supply/return control valves 104, 106, and 108 are located in secondary supply/return passages 110, 112 and 114, respectively, which communicate with a primary supply/return passage 116. As before, when closed, the control valves 104, 106 and 108 isolate jacks 16 and 20 from each other and from jacks 12 and 312. A check valve 129 is mounted within passage 118 for providing one-way flow of fluid from pump 124 through line 120 to primary supply/return passage 116.

A return passage 130 is formed in block 102, communicating between primary supply/return passage 116 and a line 132. A check valve 136A is provided in passage 130 for controlling return flow of fluid from primary supply/return passage 116 to reservoir 94. Valve 136A is a pressure operated one way check valve that is normally open in the return to tank direction as shown in FIG. 3 when pilot pressure at P3 is at or near zero, such as when the pump is not energized, to allow flow in return passage 130 from primary supply/return passage 116 to line 132. As pilot pressure P3 raises from pressurization of the system, valve 136A automatically shifts to block flow through passage 130.

Passage 314 branches from passage 110 downstream from control valve 104 to feed jack 312. There are two normally closed, pressure operated one way check valves 350 and 351 in respective passages 110 and 314. Both valves 350 and 351 open when pilot pressure P4 is sufficient, such as when the system is energized. With both valves 350 and 351 open hydraulic fluid can flow to jacks 12 and 312 in parallel in which case the hydraulic fluid pressure in the first front jack assembly 12 will equalize with the hydraulic fluid pressure in the second front jack 312. When the system is de-energized, valves 350 and 351 work to isolate and hydraulically lock jacks 12 and 312 from one another. Hydraulic fluid from jack 12 can flow back through line 316 and into line 314, but then it is prevented by valve 351 from entering line 318 leading to jack 312. Similarly, hydraulic fluid in line 318 can flow back through line 318 to line 314 where it is stopped by valve 350 so as not to flow into line 316, which leads to jack 12. Thus, valve 350 and 351, in combination with control valves 104, 106 and 108 hydraulically lock each of the four jacks independent of one another when in a static condition.

However, interposed between valves 104, 106 and 108 are dual restricting valves 137A, 138A and 140A in passages 110, 112 and 114, respectively. There is an additional dual restricting valve 360 in passage 314. Valves 137A, 138A, 140A and 360 provide restricted flow in passages 110, 112, 114, and 314 respectively, during supply of pressurized fluid from primary supply/return passage 116 to jacks 12, 16, 20, and 312, respectively, to extend jacks 12, 16, 20 and 312. When fluid pressure in primary supply/return passage 116 is relieved and flow control valves 104, 106, and 108 are shifted downwardly to provide retraction of jacks 12, 16, 20 and 312 valves 137A, 138A, 140A and 360 shift downwardly by pilot pressure to allow restricted return flow of fluid from jacks 12, 16, 20 and 312 to primary supply/return passage 116 through valves 350 and 351, until pressure on jacks 12, 16, 20 and 312 is relieved to a predetermined extent at which they return to their initial position.

It should be appreciated that preferred embodiments of the invention have been described above. However, many modifications and variations to these preferred embodiments will be apparent to those skilled in the art, which will be within the spirit and scope of the invention. Therefore, the invention should not be limited to the described embodiment. To ascertain the full scope of the invention, the following claims should be referenced.

I claim:

1. A leveling system for a vehicle comprising:
   a plurality of extendible and retractable jacks mounted to a frame of a vehicle for stationarily supporting the vehicle on a ground surface in an extended position of the jacks, the plurality of jacks including first and second jacks located toward a first end of the vehicle and third and fourth jacks located toward an end of the vehicle opposite the first end;
   a control mechanism;
   a power system interposed between the control mechanism and the jacks for supplying hydraulic fluid to the jacks to extend and retract the jacks when energized and thereby adjust the attitude of the vehicle relative to level;
   wherein hydraulic fluid is supplied to the first jack independently from the hydraulic fluid supplied to the other jacks, hydraulic fluid is supplied to the second jack independently from the hydraulic fluid supplied to the other jacks, and hydraulic fluid is supplied in common to the third and fourth jacks independently from the hydraulic fluid supplied to the first and second jacks and wherein each of the first, second, third and fourth jacks are independently hydraulically lockable.

2. The vehicle leveling system of claim 1 wherein the power system comprises:
   a hydraulic fluid reservoir from which hydraulic fluid is supplied to the jacks;
   a pump;
   and control valves to control the supply of pressurized hydraulic fluid to the jacks during the operation of the pump and prevent flow of hydraulic fluid to the reservoir when the pump is not operating, the control valves being responsive to operation of a manually operated actuator mechanism for adjusting the attitude of the vehicle relative to level, the control valves including a first control valve interposed between the hydraulic fluid reservoir and the first jack, a second control valve interposed between the hydraulic fluid reservoir and the second jack, and a third control valve interposed between the hydraulic fluid reservoir and a common line feeding the third and fourth jacks.

3. The vehicle leveling system of claim 2 wherein each of the control valves are located on a valve block, and a common line feeding the third and fourth jacks after the third control valve splits at a location within the valve block.

4. The vehicle leveling system of claim 1 wherein a normally open valve is interposed between the hydraulic fluid reservoir and the first, second and third control valves.

5. The vehicle leveling system of claim 1, wherein the normally open valve is a pressure operated one way valve.

6. The vehicle leveling system of claim 1 wherein the third jack is mounted to a longitudinal frame member on one side of the vehicle towards the front of vehicle, and the fourth jack is mounted to a longitudinal frame member on the other side of the vehicle towards the front of the vehicle.

7. The vehicle leveling system of claim 1, further electric powered control valves including a first control valve interposed between the hydraulic fluid reservoir and the first jack, a second control valve interposed between the hydraulic fluid reservoir and the second jack, and a third control valve interposed between the hydraulic fluid reservoir and a common line feeding the third and fourth jacks.

8. The vehicle leveling system of claim 7, further including a normally closed pressure operated valve interposed between the fourth jack and the third control valve.

9. The vehicle leveling system of claim 7, further including a first normally closed pressure operated valve interposed between the third control valve and the third jack and a second normally closed pressure operated valve interposed between the third control valve and the fourth jack.

10. The vehicle leveling system of claim 9, wherein the first and second pressure operated valves are one way check valves.

11. The vehicle leveling system of claim 9, wherein the first and second pressure operated valves are operated by a common pilot pressure.

12. The vehicle leveling system of claim 1, wherein said cylinders are independently hydraulically locked after the vehicle is leveled.

13. The vehicle leveling system of claim 1, wherein said cylinders are independently hydraulically locked when the power system is de-energized.

* * * * *